US011115272B1

(12) United States Patent
Kumar et al.

(10) Patent No.: US 11,115,272 B1
(45) Date of Patent: Sep. 7, 2021

(54) DETECTING CONFIGURATION DRIFT FOR COMPUTING RESOURCE STACKS

(71) Applicant: Amazon Technologies, Inc., Seattle, WA (US)

(72) Inventors: Anil Kumar, Seattle, WA (US); Matthew John Hinkle, Seattle, WA (US); Rajesh Viswanathan, Mercer Island, WA (US); Prashant Prahlad, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 233 days.

(21) Appl. No.: 15/951,921

(22) Filed: Apr. 12, 2018

(51) Int. Cl.
*H04L 12/24* (2006.01)

(52) U.S. Cl.
CPC ...... *H04L 41/0816* (2013.01); *H04L 41/0806* (2013.01); *H04L 41/0843* (2013.01); *H04L 41/0856* (2013.01); *H04L 41/0866* (2013.01); *H04L 41/22* (2013.01)

(58) Field of Classification Search
CPC ............. H04L 41/0816; H04L 41/0806; H04L 41/0843; H04L 41/0856
USPC ....................................................... 709/220
See application file for complete search history.

(56) References Cited

U.S. PATENT DOCUMENTS

| 2003/0233385 A1* | 12/2003 | Srinivasa | G06F 9/466 718/1 |
| 2012/0197972 A1* | 8/2012 | Tukol | G06F 9/44505 709/203 |
| 2014/0258479 A1* | 9/2014 | Tenginakai | H04L 41/082 709/220 |
| 2017/0192850 A1* | 7/2017 | Dachere | G06F 11/328 |
| 2018/0293374 A1* | 10/2018 | Chen | G06F 21/53 |

* cited by examiner

*Primary Examiner* — Meng Vang
(74) *Attorney, Agent, or Firm* — Nicholson De Vos Webster & Elliott LLP

(57) ABSTRACT

Techniques are described for identifying "out-of-band" modifications to an interrelated set of computing resources, also referred to herein as a computing resource stack, that was provisioned at a service provider network using an infrastructure modeling service. An infrastructure modeling service generally allows users to describe a computing resource stack in a text file or other type of descriptive representation, referred to herein as an infrastructure template, and to automatically provision computing resource stacks defined in templates at a service provider network. Users may at times make so-called out-of-band modifications to one or more computing resources of a provisioned computing resource stack, either inadvertently or in response to time-sensitive demands, where an out-of-band modification is made outside of the infrastructure modeling service.

20 Claims, 9 Drawing Sheets

Stack Management × https://www.xyz.com/stackManagement

STACK MANAGEMENT CONSOLE 202

| | Logical ID | Physical ID | Type | Resource drift status | Timestamp |
|---|---|---|---|---|---|
| ☐ | DLQ | https://xyz.us-west-1.service.com/28 | Queue | NOT DRIFTED | 2017-11-21 12:17:22 UTC-0800 |
| ☒ | Queue | https://xyz.us-west-1.service.com/26 | Queue | MODIFIED | 2017-11-21 12:17:26 UTC-0800 |

EXPECTED SETTINGS 502

{
 "ReceiveMessageWaitTimeSeconds": 0,
 "DelaySeconds": 20,
 "RedrivePolicy": {
  "deadLetterTargetArn": "arn:sqs:us-east"
  "maxReceiveCount": 10
 },
 "MessageRetentionPeriod": 345600,
 "MaximumMessageSize": 262144,
 "VisibilityTimeout": 60,
 "QueueName": "Drift-DEMO-Queue-T64334LA"
}

CURRENT SETTINGS 504

{
 "ReceiveMessageWaitTimeSeconds": 0,
 "DelaySeconds": 20,
 "KmsMasterKeyID": "alias/aws/sqs"
 "MessageRetentionPeriod": 345600,
 "MaximumMessageSize": 262144,
 "VisibilityTimeout": 600,
 "KmsDataKeyReusePeriod": 300,
 "QueueName": "Drift-DEMO-Queue"
}

DIFFERENCES 506

Select all | Clear

☒ /RedrivePolicy – REMOVE
☒ /VisibilityTimeout – NOT_EQUAL
☒ /KMSMasterKeyID – ADD
☒ /KMSDataKeyReusePeriod – ADD

COMPUTING RESOURCE LIST 508

*FIG. 5*

DETECTING CONFIGURATION DRIFT FOR COMPUTING RESOURCE STACKS

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 5 illustrates a GUI displaying details of drift detection for a selected computing resource from a resource stack according to some embodiments.

DETAILED DESCRIPTION

Figure 1:
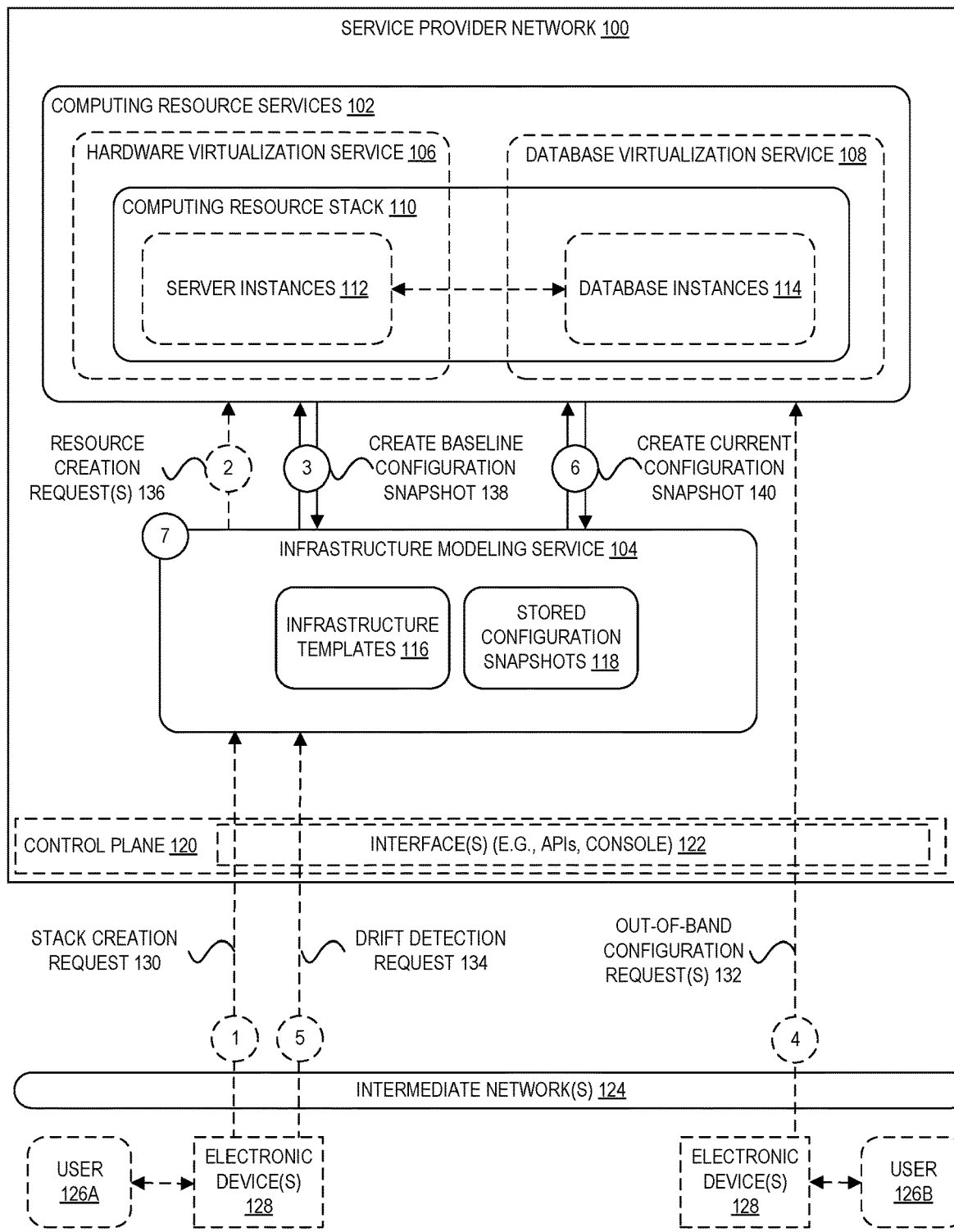
FIG. 1 is a diagram illustrating an environment for detecting configuration drift for a computing resource stack provisioned at a service provider network based on an infrastructure template according to some embodiments.

Various embodiments of methods, apparatus, systems, and non-transitory computer-readable storage media are described for identifying "out-of-band" modifications to an interrelated set of computing resources, also referred to herein as a computing resource stack, that was provisioned at a service provider network using an infrastructure modeling service. In an embodiment, an infrastructure modeling service allows users to describe a computing resource stack in a text file or other type of descriptive representation, referred to herein generally as an infrastructure template, and to provision computing resource stacks defined in templates at a service provider network. The provisioning of computing resources defined in an infrastructure template may generally involve an infrastructure modeling service creating and configuring the resources using one or more computing resource services provided by the service provider network (for example, a hardware virtualization service to create compute instances, a database virtualization service to create database instances, and so forth). The use of an infrastructure modeling service enables users to provision computing resource stacks in an automated and repeatable manner, relieving users from performing many manual actions or writing custom scripts to provision computing resource stacks in an automated fashion.

According to embodiments described herein, an infrastructure modeling service is able to identify modifications to a computing resource stack made outside of an infrastructure modeling service and to present information indicating such modifications to users. For example, as indicated above, users can use an infrastructure modeling service to automatically provision a computing resource stack at a service provider network. A computing resource stack can include a variety of interrelated computing resources such as, for example, server instances, database instances, other software components, as well as various types of associated system configurations, networking configurations, security configurations, and so forth. When a computing resource stack is deployed initially using an infrastructure modeling service, the configurations of the constituent computing resources generally are expected to match the configurations specified in the template used to create the resource stack (in addition to any default configuration values that may not have been explicitly defined in the template but are automatically configured by the services at which the computing resources are implemented). Users can modify various configurations associated with a computing resource stack, including to add or remove computing resources from the stack entirely, by modifying an associated infrastructure template and using the infrastructure modeling service to update the provisioned computing resources accordingly. Using the infrastructure modeling service in this manner helps to ensure that a provisioned computing resource stack and a corresponding infrastructure template describing the computing resource stack stay in sync with one another.

However, users may also at times make so-called "out-of-band" modifications to one or more computing resources of a provisioned computing resource stack, either inadvertently or in response to time-sensitive demands. For example, if a provisioned computing resource stack includes one or more virtual machines (VMs) implemented by a hardware virtualization service, one or more users might make modifications to the VMs via interfaces provided by the hardware virtualization service (for example, using a web-based GUI, APIs, or other interfaces) or by modifying the VMs using a console interface or other direct interface to the VMs, either because the users are unaware that the VMs were created using the infrastructure modeling service or because the users are addressing an urgent issue involving the VMs. As another example, a software update or other type of change to a service implementing one or more computing resources of a stack may cause changes to various configuration settings after a computing resource stack is provisioned. These types of out-of-band modifications generally are not immediately visible to an infrastructure modeling service and, thus, the expected configuration settings associated with a provisioned computing resource stack (that is, any configuration settings specified in the infrastructure template and any default configuration values associated with the resources) and the actual, current configuration settings of the computing resources (that is, the current configuration settings of the computing resource stack including any out-of-band modifications made to one or more of the resources) can become out of sync. The difference between the expected, or baseline, configuration settings and the actual, live configuration settings of a computing resource stack may be referred to herein generally as "configuration drift."

The existence of configuration drift for a computing resource stack can be problematic for several reasons. For example, modifications to configuration settings associated with computing resources described in an infrastructure template can cause various types of failures to occur when users attempt to further modify and update a computing resource stack using the infrastructure modeling service, leading to operational pain and degraded customer experience. As one example, consider a database instance provisioned as part of a computing resource stack, where the database instance includes a configuration setting that defines an amount of allocated storage for the database instance. In some service provider networks, a value associated with this configuration setting is only allowed to increase (that is, the amount of allocated storage for the database instance can only increase) and attempts to set the allocated storage to a value less than its current value results in a failure. If a user makes an out-of-band modification to increase this allocated storage configuration setting, the infrastructure modeling service may not be aware of the change and assume that the value is the original baseline value. An attempt to update the computing resource stack using the infrastructure modeling service may thus lead to a stack update failure if the update attempts to set the allocated storage to a value lower than the current configured value, causing the stack update to rollback and leaving the user with the task of determining the point of failure and manually remediating the conflict. Many other types of potential configuration conflicts exist across the many different types of computing resources that can be provisioned using an infrastructure modeling service. Traditionally, users have been discouraged from making such out-of-band modifications to computing resources of a provisioned computing resource stack for these and other reasons, however, this guidance is difficult to mandate in practice as the number of computing resources and users associated with computing resource stacks increases. Further, as indicated above, sometimes customers may intentionally make out-of-band modifications to computing resources to respond to urgent operational events.

To facilitate users' ability to identify such out-of-band configuration modifications and other forms of configuration drift, among other features, an infrastructure modeling service described herein includes tools that can be used to detect computing resource stack configuration drift. According to embodiments described herein, for example, an infrastructure service may create a computing resource stack at the service provider network based on an infrastructure template created by a user. The computing resource stack may include any number of interrelated computing resources implemented using one or more computing resource services of the service provider network. For example, the computing resources can include resources implemented by a hardware virtualization service (for example, various types of server instances), by a database virtualization service (for example, one or more database instances), using various network and security related services (for example, to configure networks and security groups), and so forth. As indicated above, an infrastructure template includes configuration information that is used by the infrastructure modeling service to deploy and configure the one or more computing resources at the service provider network.

In an embodiment, an infrastructure modeling service creates a baseline snapshot of configuration settings associated with one or more computing resource of the computing resource stack implemented in the service provider network based on the infrastructure template. For example, for each computing resource of a provisioned computing resource stack, the infrastructure modeling service may request information describing the resource from a service at which the computing resource is implemented. The obtained configuration settings can include settings corresponding to those defined in the infrastructure template used to create the resources, in addition to any default configuration settings associated with the computing resource when the resource is created at the respective service.

In an embodiment, one or more of the services at which the computing resources are implemented may receive one or more out-of-band requests to modify a computing resource of the provisioned computing resource stack, or the services may modify one or more the configuration settings based on other events. As indicated above, although an infrastructure modeling service can be used to modify resources of a computing resource stack by modifying a corresponding infrastructure template, there may be instances where one or more users make out-of-band modifications to the computing resource either inadvertently or to address urgent issues.

In an embodiment, the infrastructure modeling service receives a request to identify configuration drift for a computing resource stack. For example, a user may suspect that one or more out-of-band modifications have been made or wish to determine whether such modifications have been made before implementing further updates to the computing resource stack. A user may, for example, use a graphical console interface, a command line interface (CLI), or application programming interface (API) request to request that configuration drift detection be performed. In other examples, the initiation of a configuration drift detection may occur without direct user input and may be initiated, for example, based on a recurring schedule, in response to input from another application or service, in response to identifying a modification made to one or more resources of the computing resources stack, or based on any other event.

In an embodiment, the infrastructure modeling service then creates a current snapshot of the configuration settings associated with the one or more computing resources of the computing resource stack. The infrastructure modeling service can then compare the current snapshot to the earlier created baseline snapshot to identify any differences between the two (for example, to identify whether any configuration settings have been modified, whether any configurations or entire computing resources have been added or deleted, and so forth). In an embodiment, the infrastructure modeling service can present information indicating any identified differences between the baseline snapshot and the current snapshot. For example, users may view configuration drift details using various GUIs, command line interface (CLI) commands, and APIs provided by the infrastructure provisioning service. The ability to easily and automatically detect configuration drift in a computing resource stack provides users with visibility into configuration changes that are otherwise difficult to ascertain, thereby enabling users to plan for and readily take corrective actions when needed and also enabling users to make out-of-band changes in time-sensitive situations knowing that the modifications can be readily identified at a later time.

FIG. 1 is a block diagram illustrating an environment for detecting configuration drift for a computing resource stack provisioned at a service provider network using an infrastructure template according to some embodiments. In some embodiments, computing resource services 102 (including a hardware virtualization service 106 and a database virtualization service 108 in the example of FIG. 1, but which may include any number of services in practical implementations) and an infrastructure modeling service 104 operate as part of a service provider network 100 and each comprise one or more software modules executed by one or more electronic devices at one or more geographic locations and data centers managed by the service provider.

A service provider network 100 allows users to utilize one or more of a variety of types of computing-related resources, such as compute resources (for example, executing virtual machine (VM) instances and/or containers, executing batch jobs, executing code without provisioning servers), data/storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), and so forth. These and other computing resources may be provided as services, such as a hardware virtualization service 106 that can execute server instances 112, a database virtualization service 108 that can execute database instances 114, a storage virtualization service that can store data objects, and so forth. The users (or "customers") of service provider networks 100 may utilize one or more user accounts that are associated with a customer account, though these terms may be used somewhat interchangeably depending upon the context of use. Users may interact with a service provider network 100 across one or more intermediate networks 124 (for example, the internet) via one or more interface(s) 122, such as through use of application programming interface (API) calls, via a console implemented as a website or application, etc. The interface(s) 122 may be part of, or serve as a front-end to, a control plane 120 of the service provider network 100 that includes "backend" services supporting and enabling the services that may be more directly offered to customers.

To provide these and other computing resource services, service provider networks 100 often rely upon virtualization techniques. For example, virtualization technologies may be used to allow users to control or utilize server instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple server instances can be implemented using a single electronic device. Thus, a user may directly utilize a server instance hosted by the service provider network to perform a variety of computing tasks, or may indirectly utilize a server instance by submitting code to be executed by the service provider network, which in turn utilizes a server instance to execute the code (typically without the user having any control of or knowledge of the underlying server instance(s) involved).

As indicated above, it is desirable at times for users to identify configuration drift associated with computing resources of a computing resource stack, for example, a computing resource stack 110 created using an infrastructure modeling service 104 and based on an infrastructure template 116 describing the computing resource stack 110. As indicated above, configuration drift generally refers to differences between an expected set of configuration settings associated with a computing resource stack (for example, as indicated by a corresponding infrastructure template and any default configuration values associated with the computing resources) and a current set of configuration settings associated with the computing resource stack. A user may desire to identify such configuration drift so that the user can reconcile the current configuration settings and a corresponding infrastructure template, for example, to avoid issues with updating the computing resource stack using an out of sync infrastructure template, among other reasons.

For example, at the circle labeled "1" in FIG. 1, a user generates a computing resource stack creation request 130 to create a computing resource stack based on an infrastructure template 116. In some embodiments, a console 122 may include a GUI configured with user interface elements that allow a user 126A to create, modify, view, and select infrastructure templates 116 used to provision computing resource stacks (for example, a computing resource stack 110) at a service provider network 100. In one embodiment, an infrastructure template is a file (for example, a JavaScript Object Notation (JSON) or YAML-formatted text file) that describes the computing resources and associated configuration settings used to implement a computing resource stack, along with descriptions of interconnections among the resources. In this example, a user 126A may use such a GUI to select a particular infrastructure template 116 and to provide further input indicating a desire to create the computing resource stack described therein at the service provider network 100, thereby causing an electronic device 128 to generate the computing resource stack creation request 130.

In an embodiment, at circle "2," based on a computing resource stack creation request 130, an infrastructure modeling service 104 uses a selected infrastructure template 116 to provision a computing resource stack 110 at the service provider network 100 according to the configuration settings indicated in the template. To provision a computing resource stack 110, the infrastructure modeling service 104 may interact with one or more computing resource services 102 (for example, by generating one or more resource creation requests 136 via APIs or other interfaces) to create and configure each computing resource of the stack using the various services. In the example shown in FIG. 1, the computing resource stack 110 includes one or more server instances 112 implemented at a hardware virtualization service 106 and one or more database instances 114 implemented at a database virtualization service 108; in general, a computing resource stack 110 can include any number of separate computing resources involving any number of separate computing resource services 102 (including, for example, a virtualized storage service, a virtual networking service, a network security service, and so forth). Assuming the deployment of the user's computing resource stack 110 was successful, the infrastructure modeling service 104 may inform the user 126A of the successful deployment and the user can begin using the computing resource stack 110 as desired.

In an embodiment, at circle "3" in FIG. 1, the infrastructure modeling service 104 creates a baseline configuration snapshot 138 at some point in time after the computing resource stack 110 is deployed at the service provider network 100. In one embodiment, a baseline configuration snapshot 138 is a collection of data indicating configuration settings associated with computing resources of the provisioned computing resource stack 110. The configuration settings included in the baseline configuration snapshot 138 can include configuration settings indicated in a corresponding infrastructure template 116 as well as any default configuration values that were not explicitly indicated in the infrastructure template but were automatically configured by the various services responsible for creating the resources. In one embodiment, a baseline configuration snapshot 138 is stored as one or more records in a database or other data store managed by the infrastructure modeling service 104 (for example, alongside other stored configuration snapshots 118 associated with other computing resource stacks). In general, a stored version of a baseline configuration snapshot includes, for one or more computing resources in the computing resource stack, a set of configuration settings (for example, various parameters and corresponding values), and may further include information indicating which computing resource stack each resource belongs to, a name of the computing resource, a version of the computing resource stack, and so forth. For example, the configuration settings for a database instance might include a setting indicating a type of database engine (for example, "Engine: mysql" where "Engine" is the parameter and "mysql" is the associated value), an amount of allocated storage (for example, "AllocatedStorage: 32"), a username and password (for example, "MasterUsername: user" and "MasterUserPassword: useruser"), and so forth.

In an embodiment, a baseline configuration snapshot 138 may typically be created at a point in time close to the deployment of the associated computing resource stack at the service provider network 100. For example, an infrastructure modeling service 104 may monitor status information associated with the computing resource stack creation process (for example, during circles "2" in FIG. 1) and once the status indicates that the stack creation process is complete, the service 104 can generate the baseline configuration snapshot 138. In an embodiment, if a user uses the infrastructure modeling service 104 to subsequently update a computing resource stack (for example, by modifying a corresponding infrastructure template 116 to change one or more resource configuration settings, add or remove one or more computing resources, or so forth), the infrastructure modeling service 104 can update the previously created baseline configuration snapshot once it determines that the computing resource stack update process has completed (for example, by again requesting the current configuration settings for some or all of the computing resources of the resource stack from the associated computing resource services 102). In some embodiments, the originally created baseline configuration snapshot may be modified to reflect any detected updates or, in other embodiments, a new baseline configuration snapshot may be created for the updated computing resources stack.

In some embodiments, some computing resource stacks may have been created without a corresponding baseline configuration snapshot, for example, because the computing resource stacks were created before the infrastructure modeling service 104 was capable of creating configuration snapshots. In this example, a baseline configuration snapshot may be created at other times such as, for example, when a user generates a drift detection request for the computing resource stack, or when the computing resource stack is updated using the infrastructure modeling service 104. In some embodiments, a baseline configuration snapshot may be based in part on values contained in a corresponding infrastructure template 116 when the initial configuration values are otherwise unknown.

In one embodiment, an infrastructure modeling service 104 may create a baseline configuration snapshot 138 by sending, for one or more computing resources of a computing resource stack, an API request or other type of message to the computing resource service 102 implementing the computing resource to obtain configuration settings for the computing resource. For example, some or all of the services 102 may provide a "describe resource" API action or similar mechanism for obtaining current configuration settings associated with a resource. As indicated above, the configuration settings returned by such a request generally include both configuration settings indicated in the template and also other default property values, that is, a property value associated with a resource that is not explicitly configured in the template but instead automatically associated with the resource by the underlying service.

In an embodiment, at circle "4" in FIG. 1, one or more computing resource services 102 may receive one or more out-of-band configuration requests 132. For example, the out-of-band configuration requests 132 may be generated by a same user 126A that initially created the computing resource stack 110 or a different user 126B who may be associated with the user 126A, for example, part of the same application development or system administration team. In an embodiment, an out-of-band configuration request 132 can include various types of requested modifications to one or more computing resources of a computing resource stack. For example, the requested modifications may include changes to one or more configuration settings associated with a computing resource, deletion of one or more configuration settings, or the deletion of a computing resource entirely. In some embodiments, an out-of-band configuration request can be made using an API or other interface provided by a computing resource service 102 or, in other examples, can be made by a user interacting directly with a computing resource (for example, by using an interface provided by a VM to modify various configurations of the VM, directly modifying configuration files associated with a resource, and so forth).

In some embodiments, an out-of-band configuration change may occur to one or more computing resources of a computing resource stack based on an event that is not directly related to an action taken by a user 126A or 126B. For example, a software or service update to a computing resource service 102 may change one or more default or configured values for computing resources implemented by the service, or the configuration settings may be modified by another application or service. As another example, a service provider network may expose new configuration values for one or more types of computing resources that were initially not available for configuration when a computing resource stack was created.

In an embodiment, at circle "5" in FIG. 1, the infrastructure modeling service 104 receives a configuration drift detection request 134. For example, a user 126A using a computing resource stack management GUI console, CLI, or other interface may identify a computing resource stack 110, or one or more selected computing resources of the stack, and further indicate a desire to detect configuration drift for the resources. An infrastructure modeling service 104, for example, may provide API actions for detecting configuration drift for an entire computing resource stack (for example, a "DetectStackDrift" action) and for detecting configuration drift for one or more individual resources in a computing resource stack (for example, a "DetectStackResourceDrift" action) or may provide a single API action with parameters to indicate whether to detect drift for one or more selected computing resources or an entire computing resource stack. An infrastructure modeling service 104 may also provide an API action to request status information for a requested configuration drift detection process (for example, to provide an indication of whether a requested drift detection process is currently in-progress, completed, or failed).

In some embodiments, a configuration drift detection process may be triggered by events other than receipt of a user-generated drift detection request 134. For example, an infrastructure modeling service 104 may automatically initiate configuration drift detection on a computing resource stack on a periodic basis (for example, once an hour, once a day), based on a user-defined schedule, in response to a request generated by another application or service, or based on any other type of triggering event.

In some embodiments, an infrastructure modeling service 104 can be configured to dynamically monitor a computing resources stack for drift configuration. For example, the infrastructure modeling service 104 can be configured to monitor a resource stack for configuration updates by regularly polling the resources for information related to configuration updates, or the service 104 may receive event messages or other types of notifications from the corresponding computing resource services or from a separate monitoring service in response to occurrences of resource configuration updates. Upon receiving an indication of a configuration update, the infrastructure modeling service 104 may determine whether the update was caused by the service 104 (for example, in response to a user modifying an infrastructure template and using the service 104 to update the corresponding resource stack) and thus does not represent configuration drift. If it is determined that a configuration update was not caused by the service 104 and thus represents an out-of-band update, the service 104 can compare the identified configuration update against a corresponding baseline snapshot to determine whether the current configuration has actually drifted. In an embodiment, in response to dynamically detecting that drift has occurred for one or more computing resources of a stack, the infrastructure modeling service 104 may generate a user alert or other type of notification to indicate to a user associated with the computing resource stack that the configuration drift has occurred.

In an embodiment, at circle "6," the infrastructure modeling service 104 creates a current configuration snapshot 140 of the computing resource stack 106 as part of performing a configuration drift detection. The current configuration snapshot 140 generally represents the actual, current configuration settings of computing resources of the computing resource stack 110. In an embodiment, the current configuration snapshot 140 can be stored along with other configuration snapshots 118 by the infrastructure modeling service 104 and used for comparison against a corresponding baseline configuration snapshot 138 to determine whether any configuration settings associated with the computing resource stack have drifted. For example, a comparison of the current configuration snapshot 140 and a corresponding baseline configuration snapshot 138 may indicate that one or more configuration settings have been modified, that one or more new configuration settings have been added, that one or more configuration settings or entire computing resources have been deleted, and so forth. On the other hand, if the current configuration snapshot 140 matches the corresponding baseline configuration snapshot 138, the infrastructure modeling service 104 may determine that no configuration drift has occurred.

In one embodiment, a current configuration snapshot 140 generally is created in a manner similar to the creation of the baseline configuration snapshot 138, that is, by requesting a description of the configuration settings from the various computing resource services 102 at which the computing resources are implemented. The current configuration snapshot 140 may similarly be stored as a record in a database or other type of data store along with other configuration snapshots 118, the snapshot including configuration settings information for each computing resource measured during the configuration drift process.

In an embodiment, at circle "7," the infrastructure modeling service 104 performs the drift detection by comparing the baseline snapshot created at circle "3" to the current snapshot created at circle "6" and determining whether any differences exist. In one embodiment, an infrastructure modeling service 104 compares the baseline snapshot and the current snapshot by directly comparing the stored snapshot data, by converting the snapshot data into a different format for comparison (for example, by converting the snapshot data into one or more text snippets based on a syntax used in infrastructure templates 116), or by using any other comparison techniques. In some embodiments, any detected differences between the baseline snapshot and the current snapshot may be stored as a separate data entity (for example, a drift snapshot) or the differences between the snapshots may be produced on demand and not stored in any particular form.

In an embodiment, an infrastructure modeling service 104 causes information indicating one or more detected differences between the baseline snapshot of the configuration settings and the current snapshot of the configuration settings to be presented to a user. For example, if the user 126A uses a console GUI to initiate the drift detection, the information may be presented in the GUI to highlight differences between the baseline snapshot and the current snapshot. FIGS. 2-6 illustrate various GUIs that can be used to assist users with requesting a configuration drift detection, viewing the status of an in-process drift detection, and viewing details related to the results of a configuration drift detection.

Figure 2:
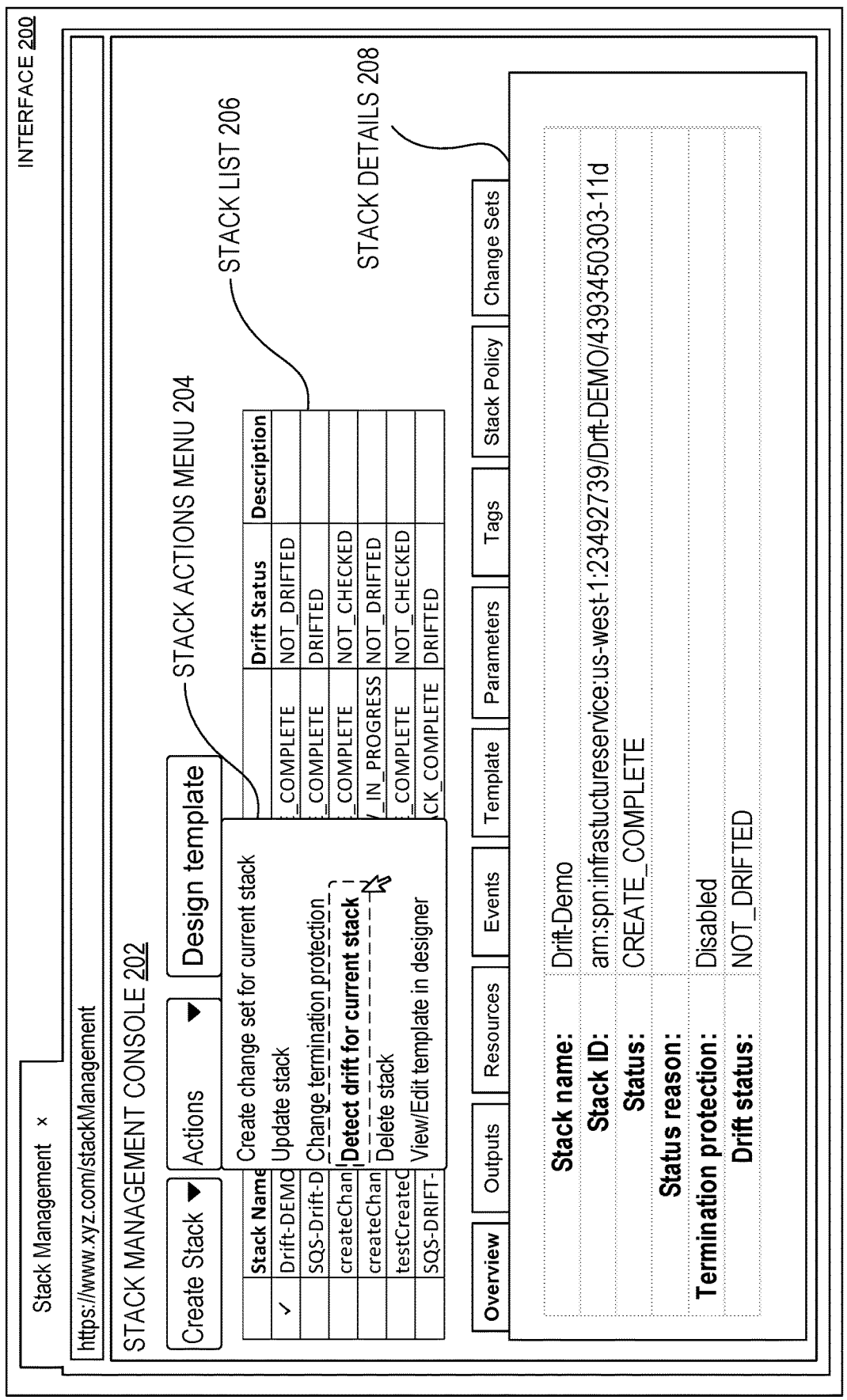
FIG. 2 illustrates a graphical user interface (GUI) displaying a list of computing resource stacks provisioned at a service provider network, and further displaying a selectable interface element used to identify configuration drift for a selected computing resource stack according to some embodiments.

FIG. 2, for example, illustrates a computing resource stack management GUI displaying a list of computing resource stacks deployed at a service provider network, and further displaying a selectable interface element that can be used to initiate a configuration drift detection for a selected computing resource stack. As shown, the GUI 200 includes a stack management console 202, which itself includes a computing resource stack actions menu 204, a computing resource stack list 206, and a selected computing resource stack details 208.

In an embodiment, a computing resource stack list 206 displays a list of computing resource stacks that may, for example, be associated with a user account. As shown, each entry in the list includes various information about a particular computing resource stack such as, for example, a name of the computing resource stack, an indication of the status of the computing resource stack (for example, indicating whether the stack is currently being created, creation of the stack has completed successfully, creation of the stack failed, and so forth), an indication of the configuration drift status of the computing resource stack (for example, indicating whether there is no detected configuration drift, there is detected configuration drift for one or computing resources of the stack, a configuration drift detection process is currently being performed, or whether a configuration drift detection process has not yet been performed), and possibly other information about the stack.

In an embodiment, computing resource stack details 208 include more detailed information about a selected computing resource stack from the computing resource stack list 206. For example, a user may provide input selecting one of the computing resource stacks in the list 206 and the interface 200 can display additional detailed information including overview information, a list of the computing resources included in the computing resource stack, event information associated with the lifespan of the computing resource stack, information about a corresponding infrastructure template that was used to create the computing resource stack, among other stack related information.

In an embodiment, a GUI 200 includes a computing resource stack actions menu 204 that enables users to select various actions to be performed with respect to one or more computing resource stacks selected from a computing resource stack list 206. For example, the types of available actions may include updating the stack (for example, based on updates made to a corresponding infrastructure template), viewing or editing the corresponding the infrastructure template, deleting the stack, and detecting configuration drift for the stack. In the example shown in FIG. 2, user input is shown selecting the action to detect configuration drift for a computing resource stack named "Drift-DEMO" from the computing resource stack list 206.

Figure 3:
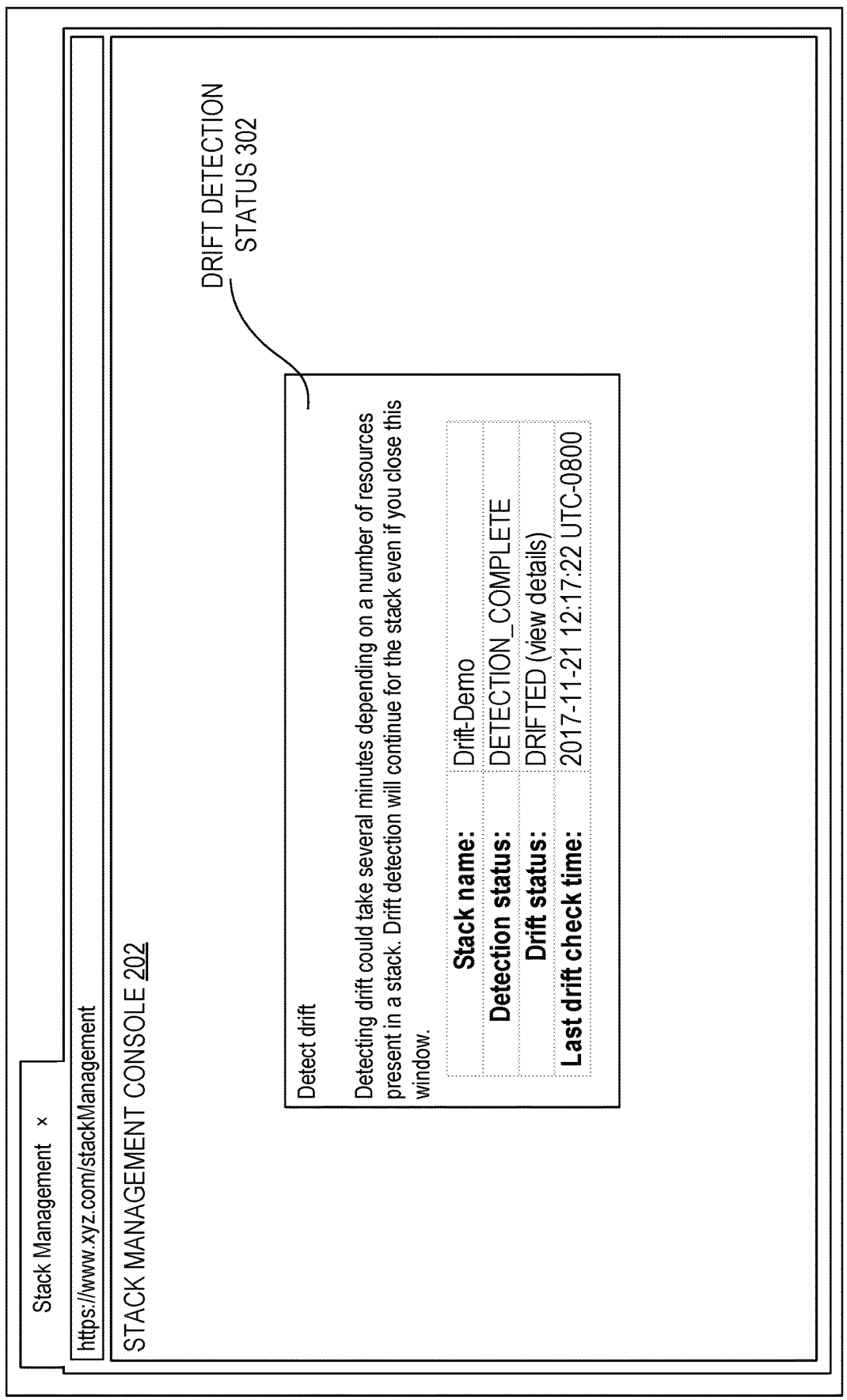
FIG. 3 illustrates a GUI displaying status information for an in-progress configuration drift detection process according to some embodiments.

FIG. 3 illustrates a GUI displaying status information for an in-progress configuration drift detection process. For example, the drift detection status 302 may be displayed in response to a user selecting the detect configuration drift action from the computing resource stack actions menu 204 in FIG. 2. As shown, the drift detection status 302 displays information about an in-progress configuration drift detection process including a name of the computing resource stack being analyzed, a current status of the configuration drift detection process (for example, in-progress, completed, failed), an indication of a result of the configuration drift detection process (for example, to be determined, configuration drift detected, configuration drift not detected, configuration drift detection process failed), and a timestamp indicating a time at which the most recent drift detection process occurred. In the example of FIG. 2, the drift detection status 302 indicates that the requested configuration drift detection process has completed and that the configuration settings for the computing resource stack have drifted.

Figure 4:
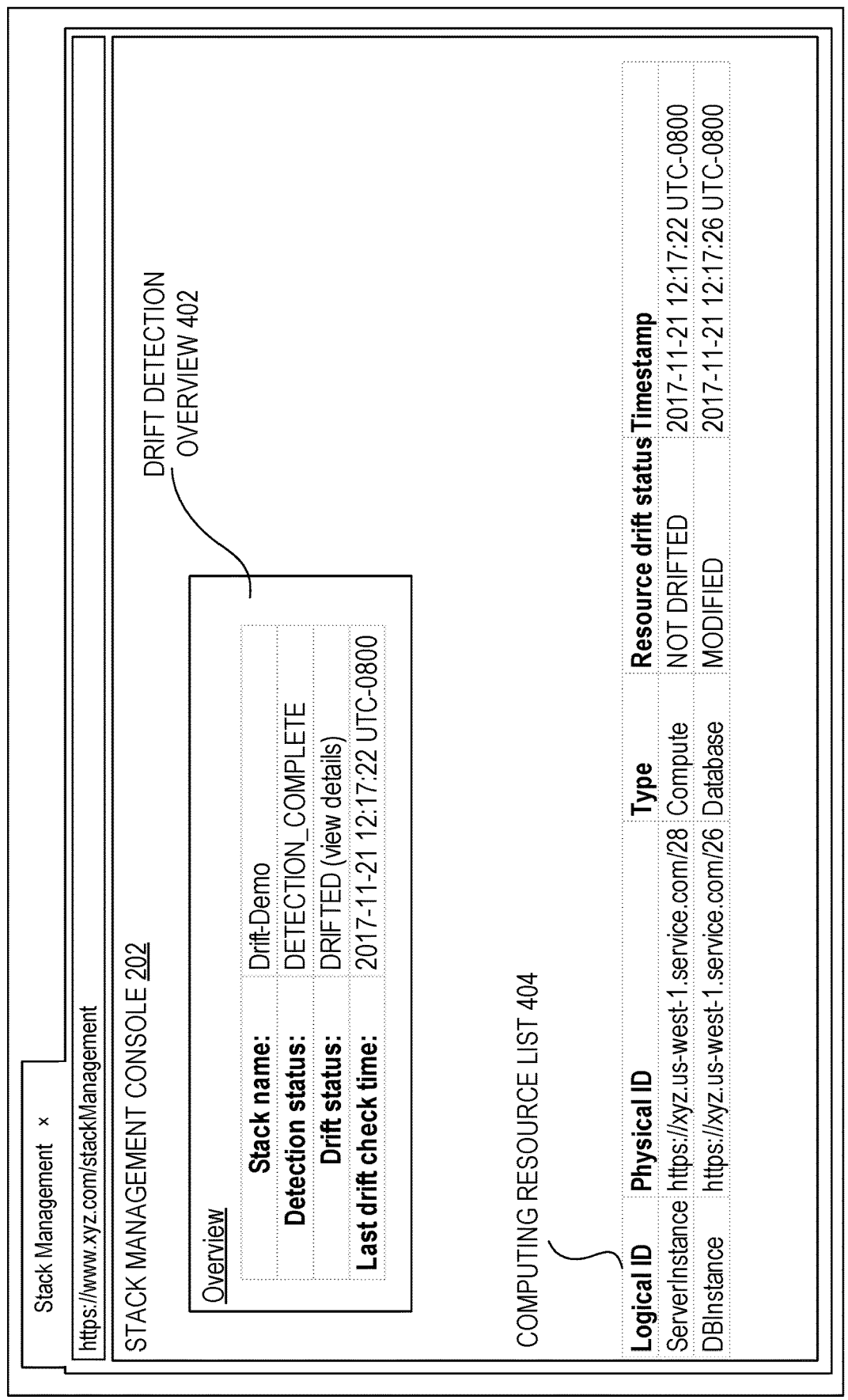
FIG. 4 illustrates a GUI displaying details of a completed drift detection process performed for a computing resource stack according to some embodiments.

FIG. 4 illustrates a GUI displaying additional details of a configuration drift detection process performed for a selected computing resource stack. The stack management console 202 in FIG. 4, for example, includes a configuration drift detection overview 402 and a list of computing resources 404 that make up the computing resource stack with an indication of whether configuration drift has been detected for each of the listed computing resources. Similar to FIG. 3, the drift detection overview 402 presents information about the configuration drift detection process including a name of the computing resource stack being analyzed, a status of the configuration drift detection process, an indication of the results of the configuration drift detection process, and a timestamp indicating when the most recent configuration drift detection process completed.

In an embodiment, a computing resource list 404 includes a list of computing resources that make up the analyzed computing resource stack, or a subset of the computing resources that were selected for performing configuration drift detection. In FIG. 4, each entry in the list 404 represents a separate computing resource and includes information related to the computing resource including a logical identifier of the resource, a physical identifier of the resource (for example, a resource URI or other identifier), an identifier of the type of computing resource (for example, a server instance, a container, a database instance, a storage volume, a security policy, a networking configuration, a virtual private cloud (VPC), a logging configuration, and so forth), an indication of whether configuration settings for the computing resource have drifted, and a timestamp indicating when configuration drift for the computing was last performed.

FIG. 5 illustrates a GUI displaying details of configuration drift detection for a selected computing resource from a resource stack. The stack management console 202 includes a computing resource list 508 similar to the resource list 404 shown in FIG. 4. In FIG. 5, a computing resource can be selected from the computing resource list 508 and various information about configuration drift that has been detected for the selected computing resource is displayed in the console 202.

For example, in FIG. 5, the second entry in the computing resource list 508 (a message queue computing resource) has been selected, possibly based on the displayed indication that configuration drift has occurred for the computing resource. In this example, configuration drift information is displayed including expected configuration settings 502, current configuration settings 504, and differences 506. The expected configuration settings 502, for example, may correspond to information from a baseline configuration snapshot that was generated for the selected computing resource. The textual representation of the expected configuration settings 502 may be generated, for example, by a function of the infrastructure modeling service 104 that converts configuration settings information obtained for a resource (for example, as obtained using an API request to the service at which the computing resource is implemented to describe the configuration settings) into a snippet of text describing the configuration settings. The syntax may, for example, correspond to syntax used to create and use infrastructure templates at the infrastructure modeling service 104. Similarly, the current configuration settings 504 may correspond to information from a current configuration snapshot that was generated for the selected computing resource and that has been converted into a snippet of text describing the current configuration settings.

In an embodiment, the displayed differences 506 highlight several different types of configuration drift that have occurred from the expected or baseline configuration settings 502 compared to the current configuration settings 504. For example, the configuration setting with the parameter name "RedrivePolicy" is bolded in FIG. 5 to indicate that the configuration setting has been removed in the current configuration settings 504. The configuration setting with the parameter name "VisibilityTimeout" is shown in italics to indicate that the value associated with the configuration setting has changed (for example, the associated value was "60" in the baseline configuration and modified to "600" in the current configuration). The configuration settings with the parameter names "KMSMasterKeyId" and "KMSDataKeyReusePeriod" are shown bolded and underlined to indicate that these configuration settings were not present in the baseline configuration settings and later added. In some embodiments, various types of configuration settings drift, including modified configuration settings, deleted configuration settings, and added configuration settings, can be presented to a user in various ways in a GUI including use of different colors, highlighting, typefaces, and so forth.

In some embodiments, an infrastructure modeling service 104 can analyze information indicating configuration drift and present information describing additional context related to the identified configuration changes. For example, if a configuration drift analysis indicates that a remote storage volume that was previously attached to a VM instance has been removed from the instance (for example, by identifying that the corresponding baseline configuration information for the removed storage volume has been deleted in the current settings), the infrastructure modeling service 104 can present information indicating the changes to the configuration information and may also present an indication of the effect of the changes (for example, by graphically displaying the removal of a remote storage volume from an instance or providing other types of descriptive information related to the configuration change).

In many of the examples described herein, the process of detecting configuration drift involves comparing a baseline configuration snapshot and a current configuration snapshot. In some embodiments, an infrastructure modeling service 104 may create a baseline configuration snapshot and any number of separate current configuration snapshots over time, resulting in a historical record of configuration drift for a computing resource stack. This historical record can be used, for example, to associate a computing resource stack with several different versions and to enable users to rollback to particular past versions, if desired.

In some embodiments, an infrastructure modeling service 104 provides various ways for a user to remediate configuration drift that has been detected. For example, a GUI or APIs may be provided that enable users to select identified instances of configuration drift and indicate whether the user wants to accept the configuration drift and update a corresponding infrastructure template, revert the drifted configuration settings to a baseline configuration (for example, reverting modified configuration values, recreating deleted computing resources, and so forth), or perform other types of remediating actions. In some embodiments, a user may set a policy that indicates automated processes for remediating configuration drift. For example, a policy may indicate that a user always wants to have modified configuration settings revert back to a baseline configuration when possible, or that the user wants to confirm or deny each configuration setting reversion, and so forth.

Figure 6:
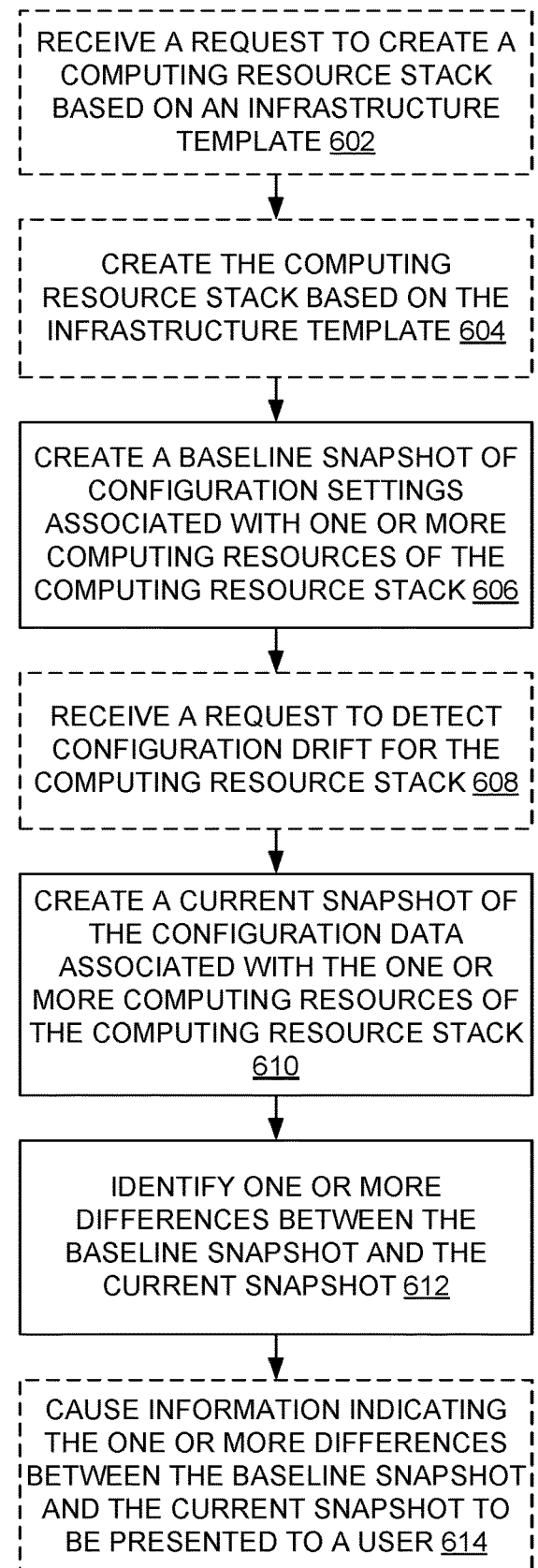
FIG. 6 is a flow diagram illustrating an example process for detecting configuration drift for a computing resource stack provisioned at a service provider network according to some embodiments.

FIG. 6 is a flow diagram illustrating operations 600 for detecting configuration drift according to some embodiments. Some or all of the operations 600 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the infrastructure modeling service 104 and other computing resource services 102 of the other figures.

The operations 600 include, at block 602, receiving a request to create a computing resource stack based on an infrastructure template. Referring to FIG. 1, for example, an infrastructure modeling service 104 may receive a computing resource stack creation request 130 to create a computing resource stack 110 based on a defined infrastructure template 116.

The operations 600 further include, at block 604, creating the computing resource stack according to the infrastructure template. For example, the infrastructure modeling service 104 may use a selected infrastructure template 116 to implement one or more computing resources defined in the template using one or more computing resource services 102 of a service provider network 100.

The operations 600 further include, at block 606, creating a baseline snapshot of configuration data for resources of the resource stack. For example, an infrastructure modeling service 104 may create a baseline snapshot of configuration data by requesting information describing one or more the computing resources from the computing resource services 102 at which the computing resources are implemented. In an embodiment, the baseline configuration snapshot may be stored in a database or other type of data store at the infrastructure modeling service 104 or using a separate computing resource service 102.

The operations 600 further include, at block 608, receiving a request to detect configuration drift for the computing resource stack. For example, a user may generate a configuration drift detection request 134 using a console GUI, an API, or other interface provided by the infrastructure modeling service 104 or service provider network 100 generally.

The operations 600 further include, at block 610, creating a current snapshot of configuration data for resources of the resource stack. For example, the infrastructure modeling service 104 may generate the current configuration snapshot by again requesting information describing one or more of the computing resources from the computing resources service 102 at which the computing resources are implemented.

The operations 600 further include, at block 612, identifying instances of configuration drift based on the baseline snapshot and the current snapshot of the configuration data. For example, an infrastructure modeling service 104 may compare a baseline configuration snapshot and a current configuration snapshot for the selected computing resource stack, or for a set of computing resources of a computing resource stack, to identify instances of configuration drift. In one embodiment, the infrastructure modeling service 104 may convert the baseline configuration snapshot and current configuration snapshot into another format for comparison. In an embodiment, the identified instances of configuration drift can include one or more of: a modification to a configuration setting defined in the infrastructure template used to create the computing resource stack, a modification to a default configuration setting associated with a computing resource of the computing resource stack, a deletion of a configuration setting associated with a computing resource of the computing resource stack, an addition of a configuration setting, and a deletion of a computing resource of the computing resources stack.

The operations 600 further include, at block 614, causing information indicating the one or more differences between the baseline snapshot and the current snapshot to be presented to a user. For example, an infrastructure modeling service 104 may provide one or more GUIs, APIs, or other interfaces that can display information indicating the one or more differences to a user.

Figure 7:
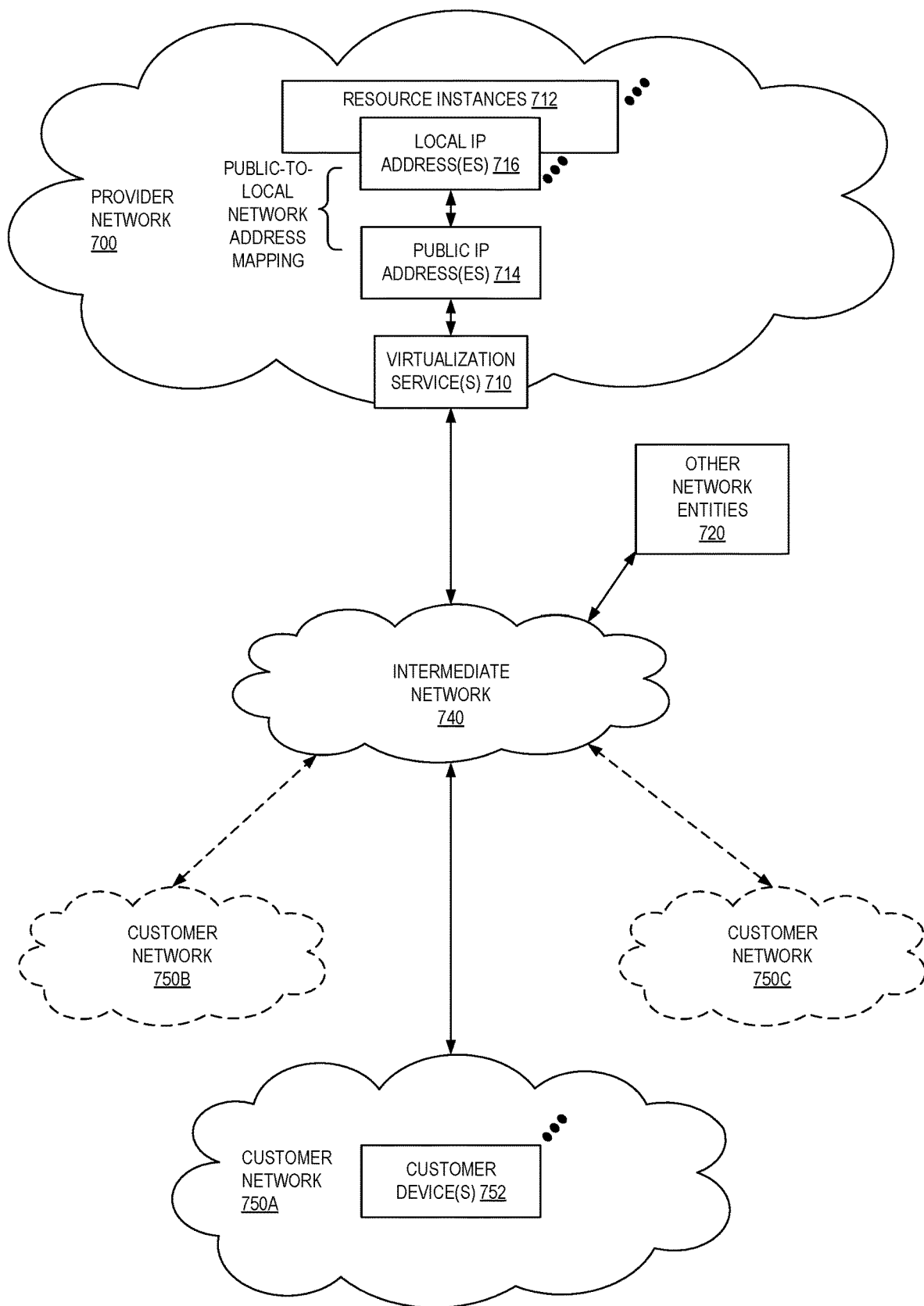
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local IP addresses 716 may be associated with the resource instances 712; the local IP addresses are the internal network addresses of the resource instances 712 on the provider network 700. In some embodiments, the provider network 700 may also provide public IP addresses 714 and/or public IP address ranges (for example, Internet Protocol version 4 (IPv4) or Internet Protocol version 6 (IPv6) addresses) that customers may obtain from the provider 700.

Conventionally, the provider network 700, via the virtualization services 710, may allow a customer of the service provider (for example, a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
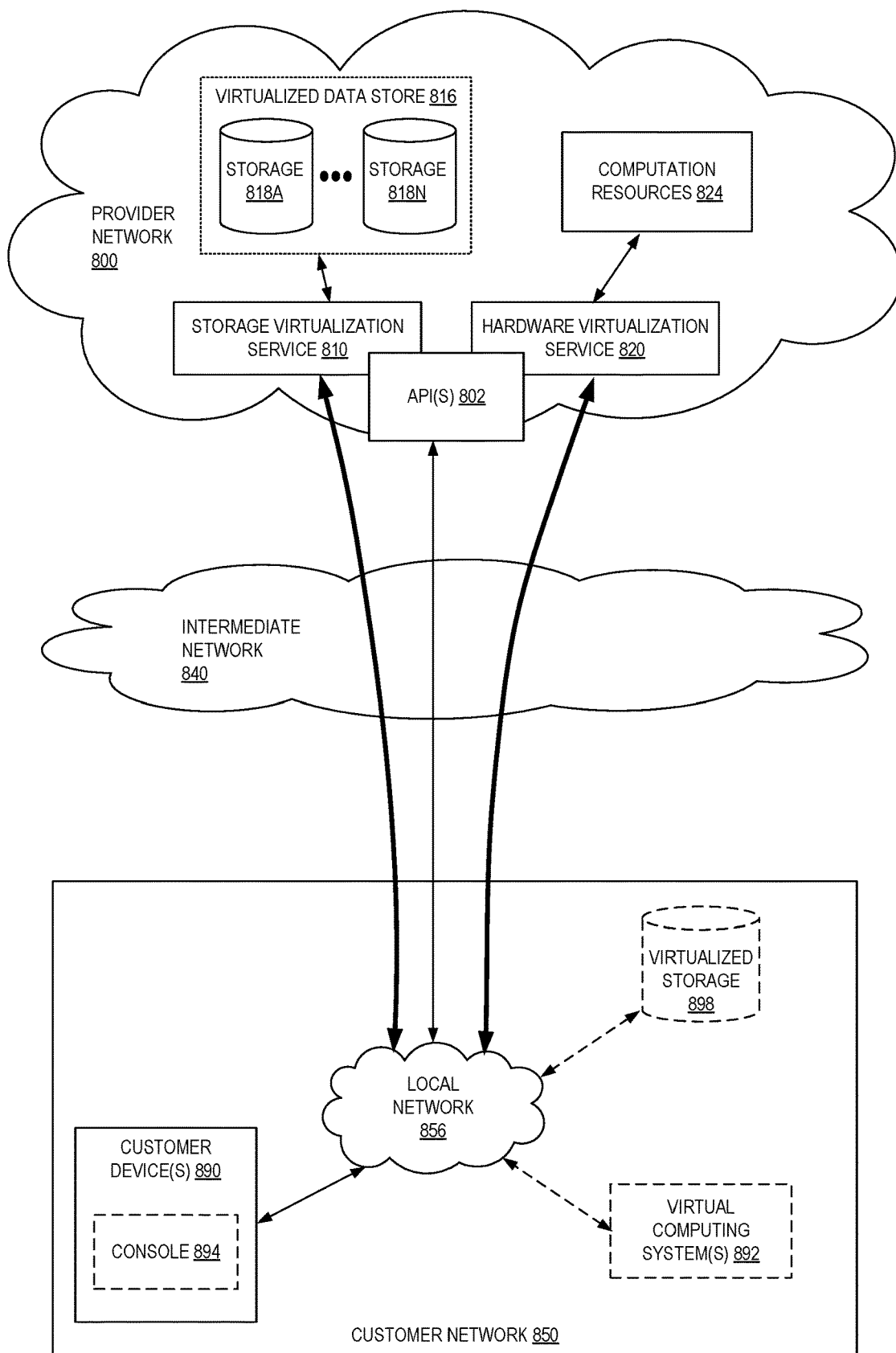
FIG. 8 is a block diagram of an example provider network that provides a storage virtualization service and a hardware virtualization service to customers according to some embodiments.

FIG. 8 is a block diagram of an example provider network that provides a storage virtualization service and a hardware virtualization service to customers, according to some embodiments. Hardware virtualization service 820 provides multiple computation resources 824 (for example, VMs) to customers. The computation resources 824 may, for example, be rented or leased to customers of the provider network 800 (for example, to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (for example, a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (for example, via console 894), the customer may access the functionality of storage virtualization service 810, for example via one or more APIs 802, to access data from and store data to storage resources 818A-818N of a virtual data store 816 provided by the provider network 800. In some embodiments, a virtualized data store gateway (not shown) may be provided at the customer network 850 that may locally cache at least some data, for example frequently accessed or critical data, and that may communicate with virtualized data store service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes, which appear to the user as local virtualized storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
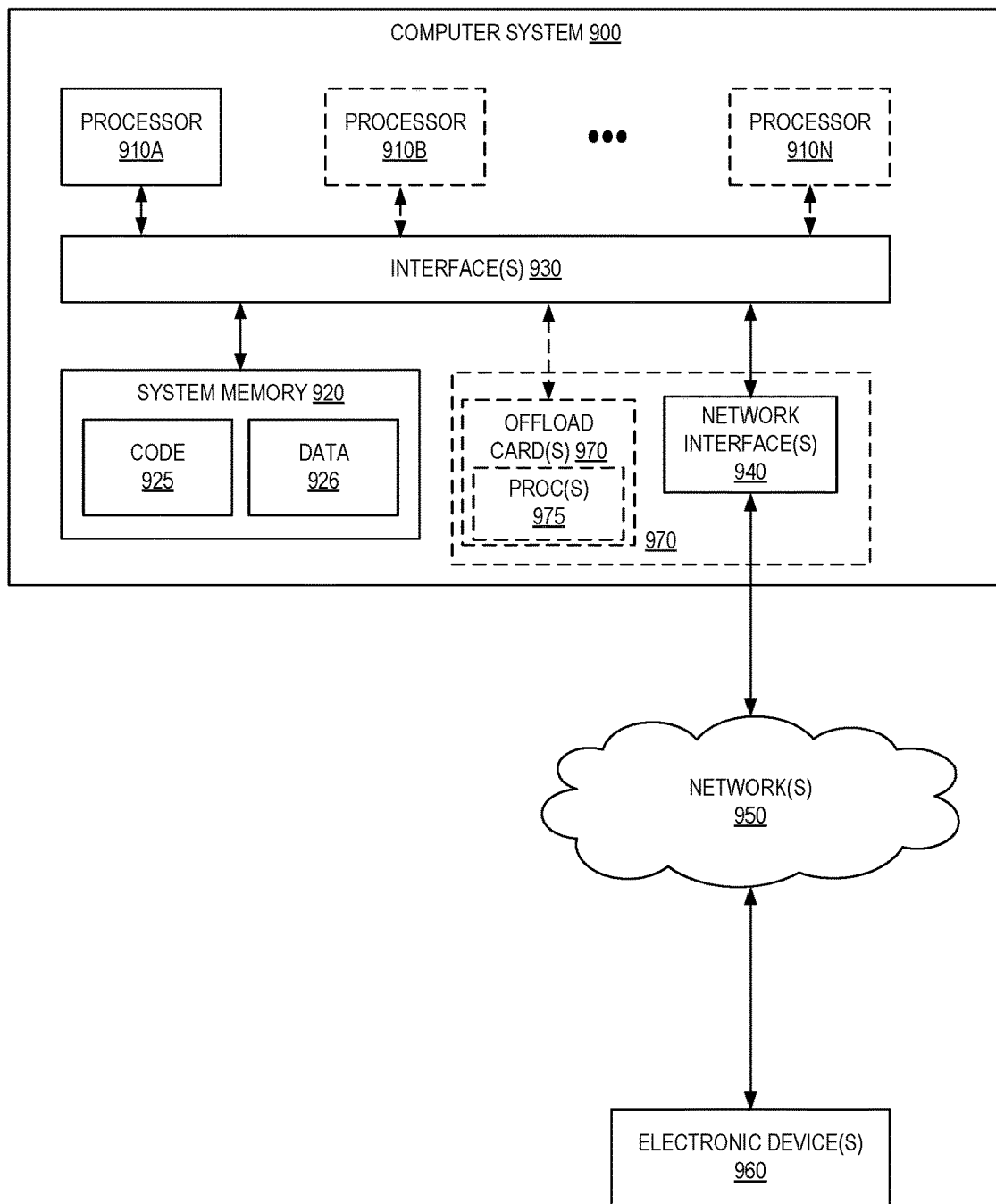
FIG. 9 is a block diagram illustrating an example computer system that may be used in some embodiments.

In some embodiments, a system that implements a portion or all of the techniques for detecting configuration drift for a computing resource stack provisioned at a service provider network using an infrastructure template as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (for example, two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (for example, system memory 920) into a format suitable for use by another component (for example, processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (for example, a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (for example, operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (for example, upon a request from a hypervisor) that is executed by the other processors 910A-910N of the computer system 900. However, in some embodiments the virtualization manager implemented by the offload card(s) 970 can accommodate requests from other entities (for example, from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 900 via I/O interface 930. A non-transitory computer-accessible storage medium may also include any volatile or non-volatile media such as RAM (for example, SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 126A and 126B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (for example, A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
creating, by a first service of a service provider network, a baseline snapshot of configuration settings associated with one or more computing resources of a computing resource stack implemented in the service provider network based on an infrastructure template, wherein the infrastructure template includes a descriptive representation of the one or more computing resources, and wherein the descriptive representation includes configuration information used by an infrastructure modeling service to deploy the one or more computing resources at the service provider network;
modifying, by a second service of the service provider network and outside of the infrastructure modeling service, a configuration setting of at least one of the one or more computing resources of the computing resource stack;
creating, by the first service, a current snapshot of the configuration settings associated with the one or more computing resources of the computing resource stack;
identifying, by the first service, one or more differences between the baseline snapshot of the configuration settings and the current snapshot of the configuration settings;
causing information indicating the one or more differences between the baseline snapshot of the configuration settings and the current snapshot of the configuration settings to be presented to a user;
updating the computing resource stack based on an update to the infrastructure template; and
updating the baseline snapshot based on the update to the computing resource stack.

2. The computer-implemented method of claim 1, wherein the second service modifies the configuration setting of at least one of the one or more computing resources of the computing resource stack based on a user-generated request received by the second service to modify the configuration setting.

3. The computer-implemented method of claim 1, wherein the one or more differences include one or more of: a modification to a configuration setting defined in the infrastructure template, a modification to a default configuration setting associated with a computing resource of one or more computing resources, a deletion of a configuration setting, an addition of a configuration setting, and a deletion of a computing resource of the one or more computing resources.

4. A computer-implemented method comprising:
   creating a computing resource stack at a service provider network based on an infrastructure template, wherein the infrastructure template includes a descriptive representation of one or more computing resources of the computing resource stack, and wherein the descriptive representation includes defined configuration settings used by an infrastructure modeling service to deploy the computing resource stack at the service provider network;
   identifying one or more modifications made outside of the infrastructure modeling service to the defined configuration settings indicated by the infrastructure template;
   causing information indicating the one or more modifications made outside of the infrastructure modeling service to the defined configuration settings to be presented;
   creating a baseline snapshot of configuration settings associated with the one or more computing resources of the computing resource stack;
   updating the computing resource stack based on an update to the infrastructure template; and
   updating the baseline snapshot based on the update to the computing resource stack.

5. The computer-implemented method of claim 4, wherein the one or more computing resources are implemented by one or more computing resource services of the service provider network, and wherein at least one of the one or more computing resource services modifies at least one of the one or more computing resources based on a user-generated request received by the service to modify the configuration setting.

6. The computer-implemented method of claim 4, wherein the one or more differences include one or more of: a modification to a configuration setting defined in the infrastructure template, a modification to a default configuration setting associated with a computing resource of one or more computing resources, a deletion of a configuration setting, an addition of a configuration setting, and a deletion of a computing resource of the one or more computing resources.

7. The computer-implemented method of claim 4, wherein the one or more computing resources are associated with the defined configuration settings and one or more default configuration settings, and wherein identifying the one or more differences includes identifying differences between the current configuration settings and the default configuration settings.

8. The computer-implemented method of claim 4, wherein the one or more computing resources include one or more of: a server instance, a container, a database instance, a storage volume, a security policy, a networking configuration, a virtual private cloud (VPC), and logging configurations.

9. The computer-implemented method of claim 4, further comprising automatically identifying the one or more differences between current configuration settings associated with the one or more computing resources on a periodic basis or based on a defined schedule.

10. The computer-implemented method of claim 4, further comprising modifying one or more configuration settings associated with the one or more computing resources to match the defined configuration settings indicated by the infrastructure template.

11. The computer-implemented method of claim 4, wherein identifying the one or more differences between the current configuration settings associated with the one or more computing resources and the defined configuration settings indicated by the infrastructure template include identifying one or more deleted computing resources, and wherein the method further comprises recreating the one or more deleted computing resources.

12. The computer-implemented method of claim 4, further comprising:
   creating a baseline snapshot of configuration settings associated with the one or more computing resources of the computing resource stack;
   creating a current snapshot of the configuration settings associated with the one or more computing resources of the computing resource stack; and
   storing the baseline snapshot and the current snapshot in a data store.

13. The computer-implemented method of claim 4, wherein causing the information indicating the one or more differences between the current configuration settings and the defined configuration settings to be presented to a user includes one or more of: displaying a graphical user interface (GUI) including a representation of the one or more differences, or sending a textual representation of the one or more differences to another device.

14. A system comprising:
   a first one or more electronic devices comprising a processor and a memory;
   a second one or more electronic devices comprising a processor and a memory;
   an infrastructure modeling service of a service provider network implemented by the first one or more electronic devices, the infrastructure modeling service including instructions that upon execution cause the first one or more electronic devices to:
      create a baseline snapshot of configuration settings associated with one or more computing resources of a computing resource stack implemented in the service provider network based on an infrastructure template, wherein the infrastructure template includes a descriptive representation of the one or more computing resources, and wherein the descriptive representation includes configuration information used by the infrastructure modeling service to deploy the one or more computing resources at the service provider network,
      create a current snapshot of the configuration settings associated with the one or more computing resources of the computing resource stack,
      identify one or more modifications made outside of the infrastructure modeling service to the configuration settings, and
      cause information indicating the one or more modifications made outside of the infrastructure modeling service to the configuration settings to be presented, update the computing resource stack based on an update to the infrastructure template, and update the baseline snapshot based on the update to the computing resource stack; and a computing resource service implemented by the second one or more electronic devices, and further implementing at least one of the one or more computing resources of the computing resource stack, the computing resource service including instructions that upon execution cause the second one or more electronic devices to:

receive a request to modify at least one configuration setting associated with a computing resource of the computing resource stack, and modify the at least one configuration setting associated with the computing resource.

15. The system of claim 14, wherein the one or more differences include one or more of: a modification to a configuration setting defined in the infrastructure template, a modification to a default configuration setting associated with a computing resource of one or more computing resources, a deletion of a configuration setting, an addition of a configuration setting, and a deletion of a computing resource of the one or more computing resources.

16. The system of claim 14, wherein the one or more computing resources include one or more of: a server instance, a container, a database instance, a storage volume, a security policy, a networking configuration, a virtual private cloud (VPC), and logging configurations.

17. The system of claim 14, wherein the instructions, upon execution, further cause the first one or more electronic devices to automatically identify the one or more differences between current configuration settings associated with the one or more computing resources on a periodic basis or based on a defined schedule.

18. The system of claim 14, wherein the instructions, upon execution, further cause the first one or more electronic devices to modify one or more configuration settings associated with the one or more computing resources to match defined configuration settings indicated by the infrastructure template.

19. The system of claim 14, wherein causing the information indicating the one or more differences between the baseline snapshot of the configuration settings and the current snapshot of the configuration settings to be presented to a user includes one or more of: displaying a graphical user interface (GUI) including a representation of the one or more differences, or sending a textual representation of the one or more differences to another device.

20. The system of claim 14, wherein identifying the one or more modifications made outside of the infrastructure modeling service to the configuration settings includes identifying one or more deleted computing resources.

* * * * *